United States Patent
Lokken

(10) Patent No.: US 7,072,899 B2
(45) Date of Patent: Jul. 4, 2006

(54) AUTOMATIC MONITORING AND STATISTICAL ANALYSIS OF DYNAMIC PROCESS METRICS TO EXPOSE MEANINGFUL CHANGES

(75) Inventor: Robert C. Lokken, Boise, ID (US)

(73) Assignee: Proclarity, Inc., Boise, ID (US)

( * ) Notice: Subject to any disclaimer, the term of this patent is extended or adjusted under 35 U.S.C. 154(b) by 0 days.

(21) Appl. No.: 11/015,719

(22) Filed: Dec. 17, 2004

(65) Prior Publication Data

US 2005/0138020 A1 Jun. 23, 2005

Related U.S. Application Data

(60) Provisional application No. 60/531,347, filed on Dec. 19, 2003.

(51) Int. Cl.
G06F 17/30 (2006.01)
G10L 15/00 (2006.01)
G05B 11/01 (2006.01)

(52) U.S. Cl. .................. 707/101; 707/10; 707/102; 704/232; 700/19

(58) Field of Classification Search ............. 707/3, 707/10, 100, 102, 104.1, 5, 6; 700/18, 19; 704/232, 243, 244, 245; 718/100
See application file for complete search history.

(56) References Cited

U.S. PATENT DOCUMENTS

| 5,749,066 | A | * | 5/1998 | Nussbaum | ................ 704/232 |
|---|---|---|---|---|---|
| 5,781,906 | A | * | 7/1998 | Aggarwal et al. | .......... 707/102 |
| 5,809,462 | A | * | 9/1998 | Nussbaum | ................ 704/232 |
| 5,978,796 | A | * | 11/1999 | Malloy et al. | ................ 707/3 |
| 6,161,105 | A | * | 12/2000 | Keighan et al. | ........... 707/100 |
| 6,446,061 | B1 | * | 9/2002 | Doerre et al. | ................ 707/3 |
| 6,741,983 | B1 | * | 5/2004 | Birdwell et al. | .............. 707/5 |
| 6,768,986 | B1 | * | 7/2004 | Cras et al. | .................. 707/2 |
| 6,829,621 | B1 | * | 12/2004 | Keller | .................... 707/104.1 |
| 6,985,779 | B1 | * | 1/2006 | Hsiung et al. | ............... 700/19 |
| 2002/0198919 | A1 | * | 12/2002 | Kelkar | ...................... 709/100 |
| 2003/0101176 | A1 | * | 5/2003 | Kelkar | ......................... 707/6 |

* cited by examiner

Primary Examiner—Shahid Alam

(74) Attorney, Agent, or Firm—Kory D. Christensen; Stoel Rives LLP

(57) ABSTRACT

A selection module allows a user to specify at least one measure to be monitored in at least one dimension of a dimensional hierarchy. A control limit calculator extracts, for each specified measure and for each specified dimension, a time series from a multidimensional database for the specified measure in the specified dimension and automatically calculates one or more control limits for the specified measure in the specified dimension based on the extracted time series using a Statistical Process Control (SPC) technique. Thereafter, a monitoring module monitors newly acquired data including each specified measure in each specified dimension for an out-of-limits condition based on one or more automatically-calculated control limits. An alert module triggers an alert in response to an out-of-limits condition being detected.

33 Claims, 6 Drawing Sheets

AUTOMATIC MONITORING AND STATISTICAL ANALYSIS OF DYNAMIC PROCESS METRICS TO EXPOSE MEANINGFUL CHANGES

CROSS-REFERENCE TO RELATED APPLICATIONS

This application claims the benefit of U.S. Provisional Application No. 60/531,347, filed Dec. 19, 2003, with inventor Robert C. Lokken, which application is incorporated herein by reference in its entirety.

TECHNICAL FIELD

The present invention relates generally to the field of data processing. More specifically, the present invention relates to techniques for analyzing multidimensional data.

BACKGROUND OF THE INVENTION

Business people tend to either manage processes or projects. Processes lend themselves to repeatable, systematic measures that allow the manager of the process to determine if that process is performing as usual or if something about the process has changed. At the highest level, a business itself is a "process"—taking input resources (time, capital, people, materials, etc.) and producing an output (sales and profits).

Businesses build processes to systematically execute their plans and produce a predicable outcome. This leads to a fundamental question, what is/has changed? People need to know when some input or output of a process has changed, because it threatens the predictability of an organization, and might indicate a need to alter the current processes in order to get the desired outcome.

Traditionally, managers received reports (paper or electronic) to review the key business process metrics and through visual inspection and experience tried to detect if something had changed. Unfortunately, this process of manual scanning was highly time-intensive and required significant knowledge on the part of the manager.

In recent years, manual alerting software has been introduced which allows the manager to set thresholds for key process metrics. The thresholds may be represented as constants or, more recently, as expressions. The software then monitors the metrics over time and triggers an alert when the threshold has been crossed.

Despite its advantages over earlier approaches, alerting software still requires significant user knowledge in order to set correct thresholds. Metrics often fluctuate, sometimes widely, over time. Setting a threshold too close to the historical average may result in many false alarms, i.e., an alert being triggered while in a normal state. On the other hand, setting a threshold too far from typical values may result in an alarm never being generated, despite the occurrence of a fundamental change in a process.

Furthermore, conventional software only automates the periodic inspection of data. If the user has hundreds or thousands of process metrics to monitor, the user must configure hundreds or thousands of alerts and for each must determine the correct threshold value or expression. Moreover, the user must periodically adjust the thresholds as conditions change over time. Setting and maintaining all of the alerts can be extremely tedious.

Increasingly, business processes are being represented in multidimensional databases. Conceptually, a multidimensional database uses the idea of a data cube to represent the dimensions of data available to a user. For example, "sales" could be viewed in the dimensions of product model, geography, time, or some additional dimension. In this case, "sales" is known as the measure attribute of the data cube, and the other dimensions are seen as feature attributes. Additionally, a database creator can define hierarchies and levels within a dimension (for example, state and city levels within a regional hierarchy).

Due to their complexity, multidimensional databases further exacerbate the monitoring problems discussed above. Manually creating thresholds for monitoring processes (measures) across dimensions can be extremely burdensome or practically impossible in some cases.

SUMMARY OF THE INVENTION

Figure 1:
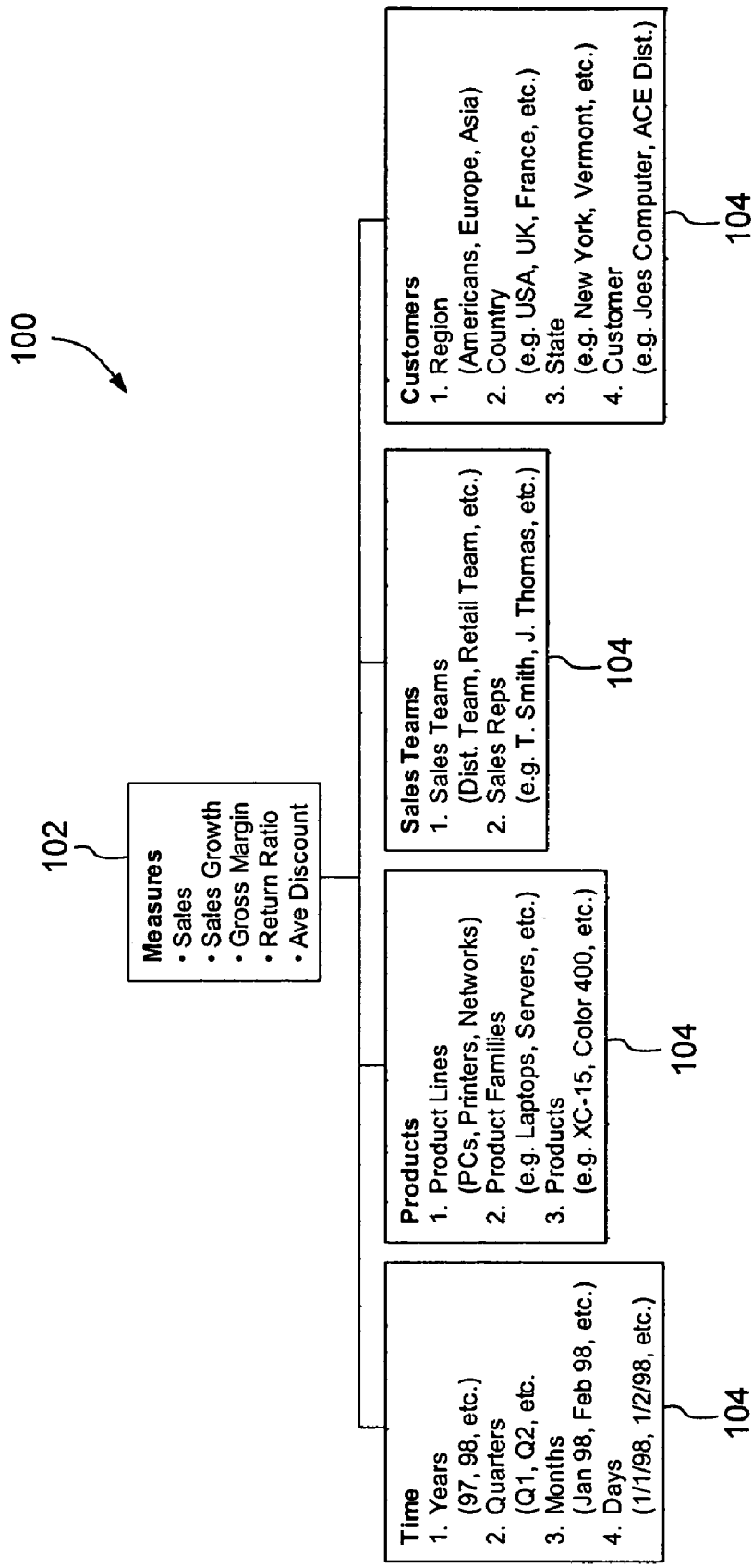
FIG. 1 is a schema for a multidimensional database.

Statistical Process Control (SPC) techniques are applied to business metrics, represented as measures in multidimensional data. These SPC techniques allow the system to filter out the normal day-to-day random variation in the metrics and test for underlying, fundamental changes in a business process. The system applies these techniques to metrics automatically, and determines the correct threshold that would determine the difference between normal random variation and fundamental changes. Thus, alerts may be triggered to notify the user that something has changed, without that user ever having to determine the specific thresholds. Moreover, users can monitor hundreds of metrics across dozens of processes for changing conditions without having to set specific alerts.

DETAILED DESCRIPTION

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 is a schema for an On-Line Analytical Processing (OLAP) database 100. OLAP refers to a type of database that facilitates analysis of data or measures 102 that has been aggregated into various categories or dimensions 104. For example, in the database 100 of FIG. 1, the measures 102 may include "Sales," "Sales Growth," "Gross Margin," "Return Ratio," "Average discount," etc. The dimensions 104 may include "Time," "Products," "Sales Teams," "Customers," etc. The dimensions 104, themselves, may include further dimensions 104, often referred to as levels. For instance, the "Customers" dimension 104 may include "Region," "Country," "State," and "Customer" levels.

Figure 2:
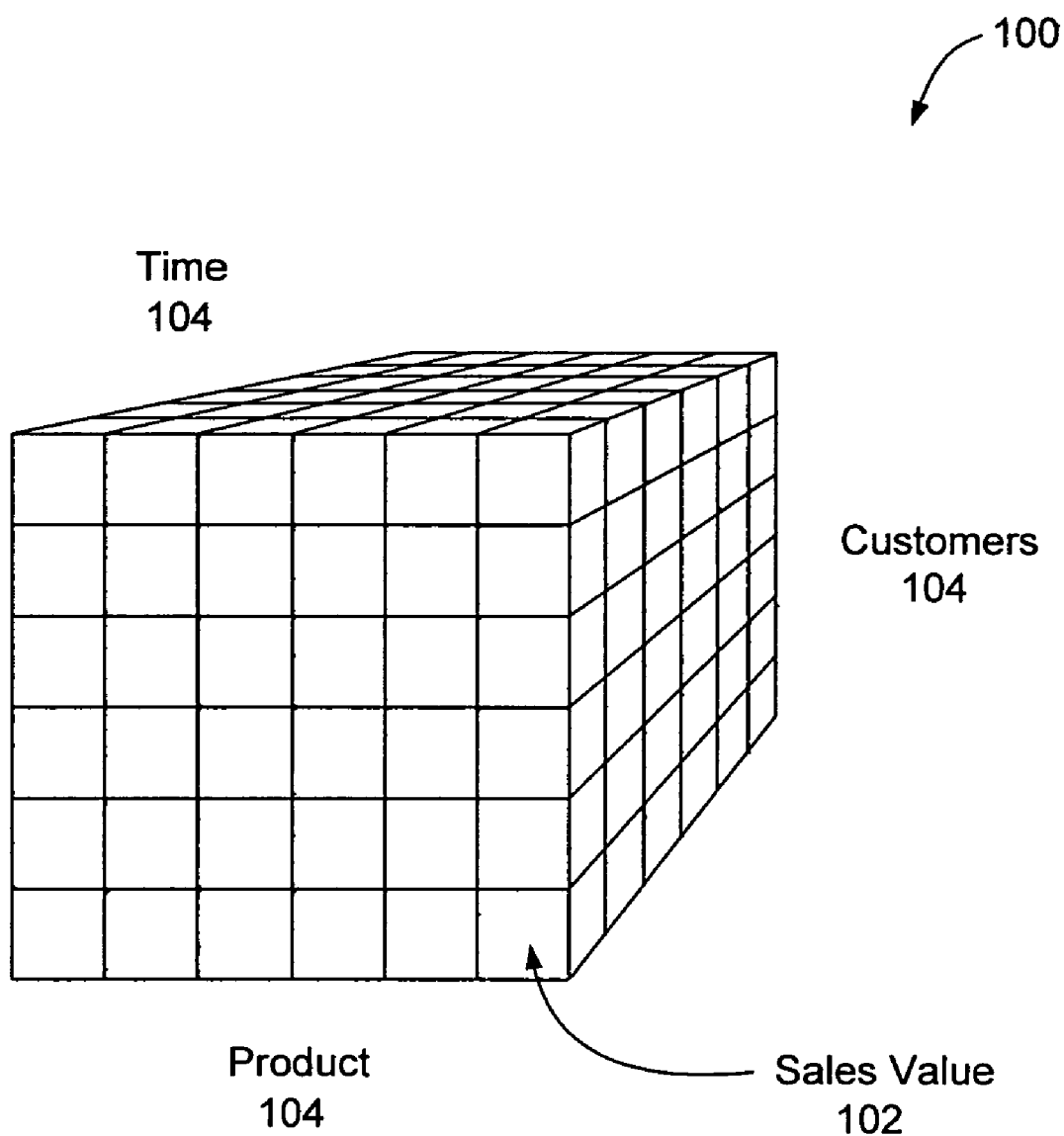
FIG. 2 is a representation of a multidimensional database as a data cube.

As shown in FIG. 2, an OLAP database 100 with three dimensions 104 may be conceptualized as a cube, with each axis representing a dimension 104 of a business (e.g., "Time," "Product," "Customers") and each cell representing a measure 102 (e.g., "Sales Value"). Business processes may be easily represented within OLAP databases 100, which fuels their popularity.

As described above, managers need to know when some input or output of a business process has changed, because it threatens the predictability of an organization, and might indicate a need to alter the current processes in order to get the desired outcome. Traditionally, managers had to rely on written reports and determine through visual inspection and experience whether something had changed. Later, manual alerting software was developed which allowed the manager to set thresholds for key process metrics. Both techniques, however, required considerable knowledge on the part of the manager in either spotting changes or setting thresholds for the monitoring software.

Figure 3:
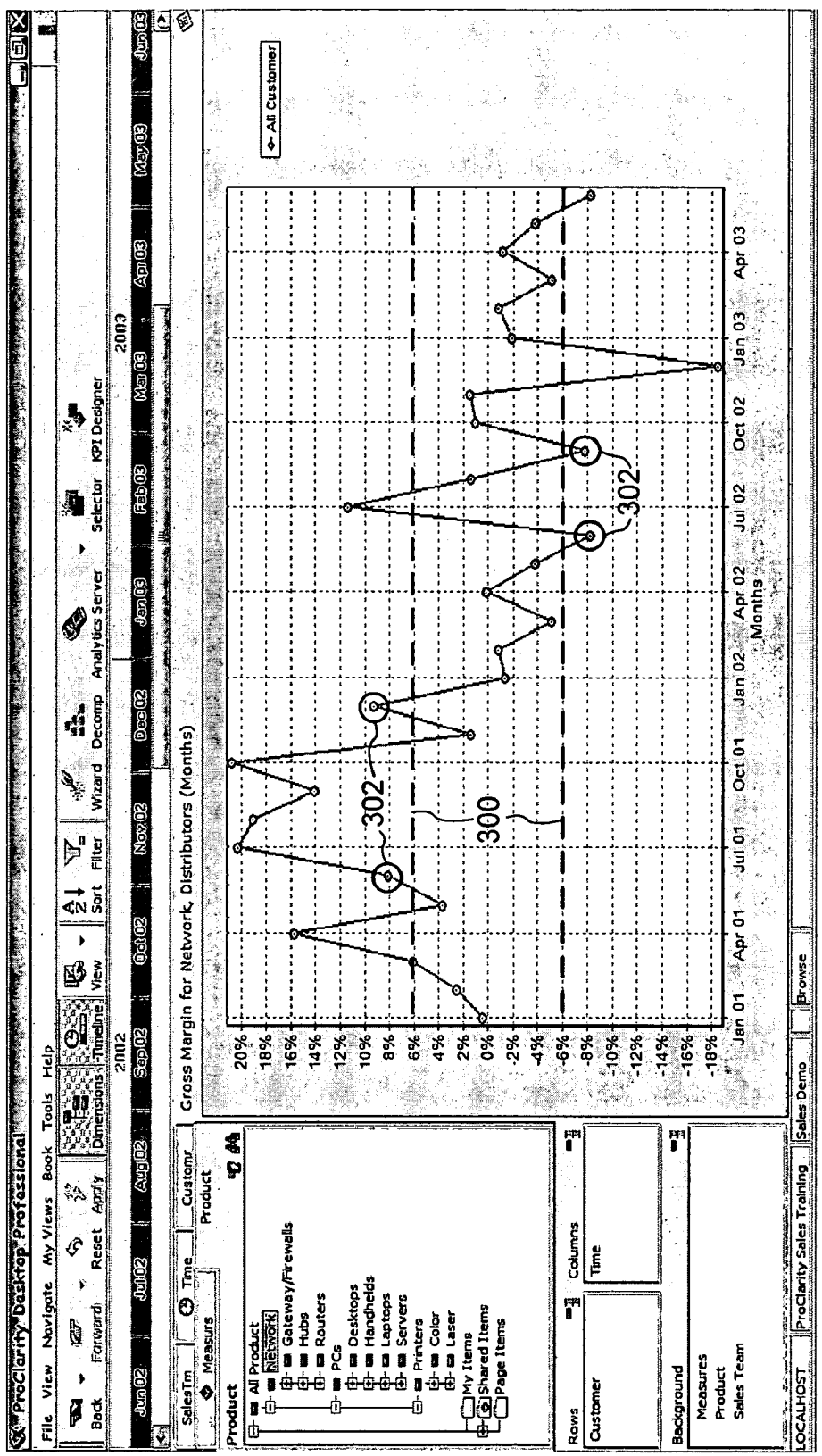
FIG. 3 is a graph of a monitored metric over time.

FIG. 3 illustrates the above problem with a graph of a "Gross Margin" measure 102 over a "Months" dimension 104. A manager might, for example, manually set an alert threshold 300 at +/−6%. However, this will result in a number of false alarms 302 for values that are within the historically normal variation for the metric. Moreover, given the complexities of multidimensional models, a manager may need to configure hundreds or thousands of alerts and for each must determine the correct threshold value or expression.

Figure 4:
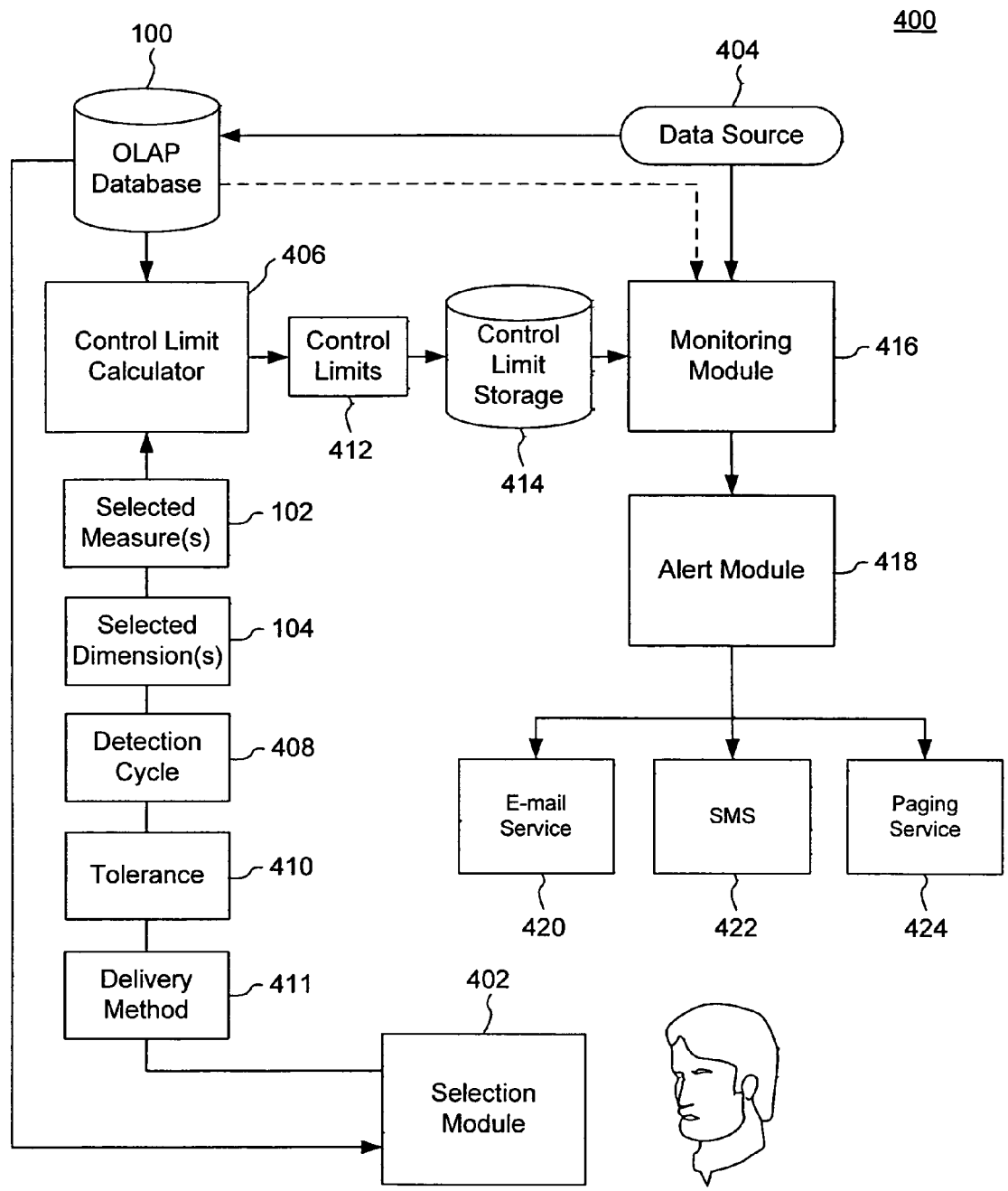
FIG. 4 is a block diagram of a system for automatic monitoring and statistical analysis of dynamic process metrics.
Figure 5:
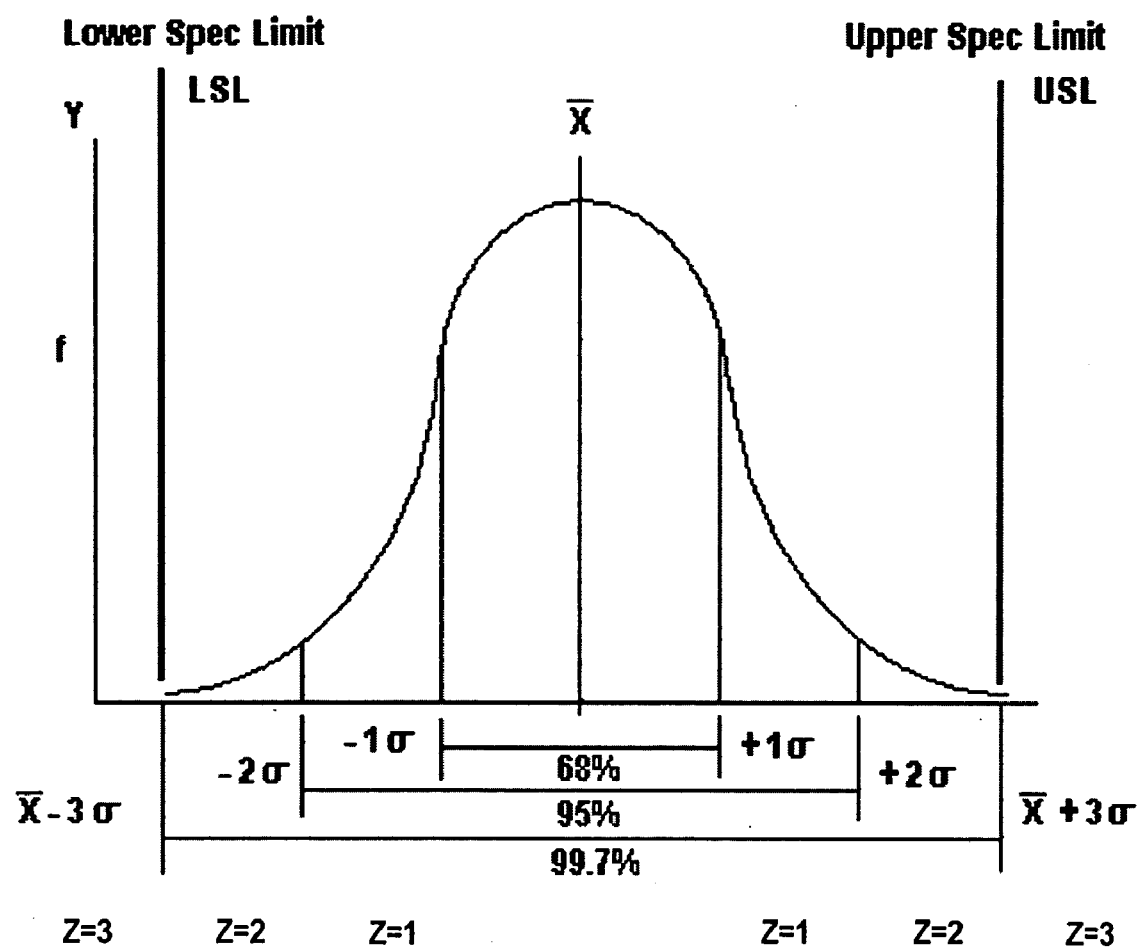
FIG. 5 is a graph of normal distribution curve.

FIG. 4 is a block diagram of a system 400 for automatic monitoring and statistical analysis of dynamic process metrics (i.e., measures) that solves the aforementioned problems and disadvantages. Initially, a user accesses a selection module 402 to select or specify one or more measures 102 to monitor across one or more dimensions 104. The measure(s) 102 and dimension(s) 104 may be selected from a graphical representation of a schema for an OLAP database 100, as shown in FIG. 1. For instance, the user may highlight or otherwise select the desired measure(s) 102 and dimension(s) 104 in the scheme and then execute a suitable command to register the selection. In other embodiments, the measure(s) 102 and dimension(s) 104 may be selected from a list, specified by entering names for the selected entities, etc.

In one embodiment, the data in the OLAP database 100 are populated from a data source 404, such as an accounting system. The data source 404 may provide new data at periodic intervals, e.g., hourly, daily, weekly, quarterly, etc., or on a transaction-by-transaction basis.

As illustrated, a control limit calculator 406 may receive the selections for the measure(s) 102 and dimension(s) 104 from the selection module 402. Optionally, the control limit calculator 406 may also receive selections of a detection cycle 408, a tolerance 410, and a delivery method 411, as described in greater detail below. The remainder of this disclosure will refer to selected measures 102 and dimensions 104 in the plural, although the singular case is also contemplated.

As an example, the user may select or specify the following options via the selection module 402:
  Metric to be monitored: Gross Margin
  Area and depth to be monitored: Products (All Products)
  Frequency of detection: Monthly
  Tolerance: 95%.

The "metric" to be monitored corresponds to a dimension 104 in the OLAP database 100. The "area and depth" to be monitored represents one or more dimensions 104 from the dimensional hierarchy illustrated in FIG. 1. In other embodiments, the user could have specified various levels within the products dimension 104, such as the "PC product line" or the "XC-15 product." The "frequency of detection" generally refers to one of the levels of the "Time" dimension 104, e.g., yearly, quarterly, monthly, daily, etc. The "tolerance" may be expressed as a confidence value, e.g., "95% confident that an alert is not a false alarm," or as some other indicator of how "tightly" the automatically-generated control limits 412 should be construed by the monitoring module 416.

Another example of options selected via the selection module 402 may include the following:
  Metric to be monitored: Sales Growth
  Area and depth to be monitored:
  Products (all levels)
  Sales teams (all levels)
  Customers Gust the "all," region, country, and state levels).
  Frequency of detection: Daily
  Tolerance: 80%.

In one implementation, the control limit calculator 406 uses Statistical Process Control (SPC) techniques to automatically calculate one or more control limits 412 for each selected measure 102 across each selected dimension 104. As described more fully below, the control limits 412 are thresholds for generating alerts when out-of-limit conditions are detected. However, unlike conventional approaches, these thresholds are automatically determined rather than being specified by the user.

In one configuration, the automatically-calculated control limits 412 are stored in control limit storage 414 with an indication of the corresponding measure(s) 102 and dimension(s) 104. The control limit storage 414 may be embodied as a database, although any suitable data structure within a computer memory or storage device may be used.

In one embodiment, the control limit storage 414 is accessible to a monitoring module 416, which monitors newly received data (e.g., selected measures 102 across selected dimensions 104) provided by the data source 404. The new data may be read directly from the data source 404 or from the OLAP database 100 (which may be periodically updated from the data source 404). In certain embodiments, the data source 404 may automatically provide new data values to the monitoring module 416 at fixed intervals, on demand, or whenever they become available.

In certain embodiments, the monitoring module 416 may check the data source 404 or OLAP database 100 periodically (as specified by the detection cycle 408 in one embodiment) for updates. As noted above, the specified detection cycle 408 may require, for example, monthly, daily, or even hourly updates.

The monitoring module 416 compares newly acquired data against the control limits 412 in the control limit storage 414 to determine whether an out-of-limit condition exists (e.g., a measure 102 exceeds or is less than an upper control limit 412 or a lower control limit 412, respectively). If an out-of-limits condition is detected, the monitoring module 416 instructs an alert module 418 to trigger an alert.

In one embodiment, an alert module 418 is responsible for delivering the alert to the user via a predefined or user-selected delivery method. Various services may be used for delivering the alert, such as an e-mail service 420, a Short Message Service (SMS) 422, or a paging service 424. A wide variety of other alert delivery services may be used as known to those of skill in the art.

In one embodiment, each alert may be delivered immediately upon being triggered. Alternatively, the alert module 418 may accumulate a number of alerts, group the alerts by recipient, and deliver the alerts to the proper recipient(s) at periodic intervals, when a set number of alerts have been triggered, or the like.

While the foregoing discussion suggests that control limits 412 for all of the specified measures 102 and dimensions 104 are calculated and stored before monitoring takes places, such is not the case in every embodiment. Implementations are contemplated in which control limits 412 are calculated for a particular measure 102 across a particular dimension 104, temporarily stored, and then immediately compared with current data to determine if an out-of-limit condition exists.

In summary, an algorithm performed by the system 400 of FIG. 4 is illustrated in the following pseudocode:
1. For each selected metric (measure 102) being monitored:
    1. For each selected dimension 104:
        1. Extract a time series (measures 102 over a time dimension 104) from the OLAP database 100;
        2. Automatically calculate control limits 412 for the selected measure 102 in the selected dimension 104;
        3. Store the control limits 412 in control limit storage 414.
2. Monitor, for newly acquired data, each selected measure 102 across each selected dimension 104 for an out-of-limits condition based on the stored control limits.
3. If an out-of-limit condition is detected, trigger an alert.
4. Group alerts by recipient and deliver via specified method(s).

Figure 6:
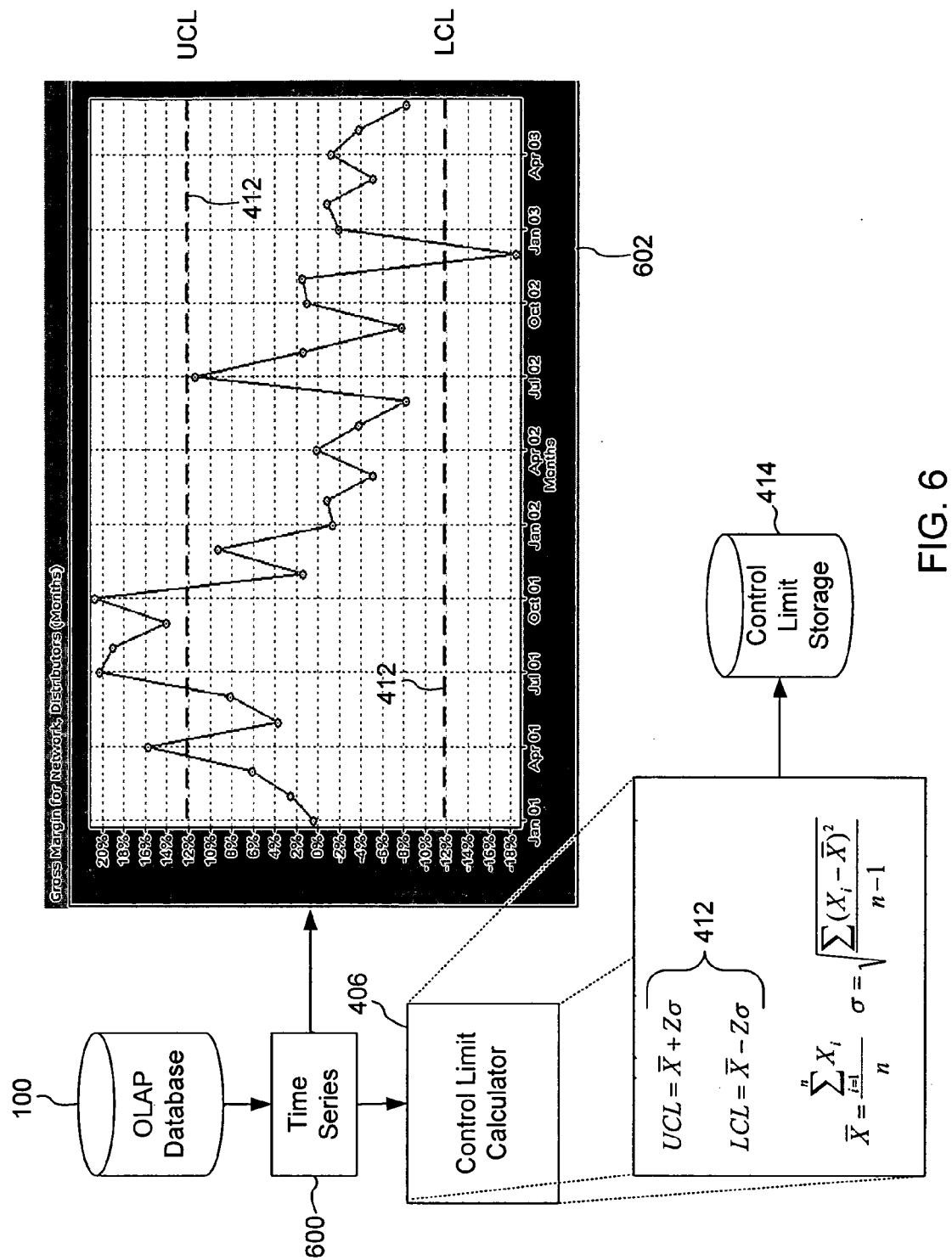
FIG. 6 is data flow diagram of the system of FIG. 4 illustrating the automatic calculation of control limits.

FIG. 6 illustrates one method for calculating control limits 412 using Statistical Process Control (SPC) techniques. SPC uses statistical methods to measure and analyze the variation in processes. Most often used in manufacturing, the intent of SPC is to monitor process quality and maintain processes within fixed tolerances.

In one embodiment, the control limit calculator 406 extracts a time series 600 (i.e., a plurality of measures 102 or other data points over a time dimension 104) from the OLAP database 100. The period of time covered by the time series 600 and the number of data points may vary depending on the available data. Generally, it is advantageous to have at least 25 or 30 data points in the baseline time period. Sometimes it is helpful to leave a few recent data points outside the baseline so that it is possible to assess the effectiveness of the baseline. Leaving some recent points out of the baseline allows them to be compared to the baseline average and control limits 412, without having had an influence in the average and control limit calculations.

For ease of illustration, the time series 600 is displayed in the context of a control chart 602. Control charts 602 are graphical representation of certain descriptive statistics for specific quantitative metrics and are a primary tool used in SPC. The control limit calculator 406 of FIG. 4 need not generate an actual control chart 602 that may be viewed by a user, although it could in one embodiment. Rather, the control chart 602 is provided to illustrate the calculations that may be automatically performed by the control limit calculator 406.

SPC relies on a number of different types of control charts 602 that are applicable to different types of data, which, in turn, result in different calculations. There are at least four major types (with dozens of variations) of control charts 602. The first type, the x-chart. (and related x-bar, r, and s-charts), is depicted in FIG. 6. The x-chart is designed to be used primarily with "variables" data, which are usually measurements, such as the length of an object, the time it takes to complete a process, or the number of objects produced per period.

In addition to the x-chart, there are three specialized types of control charts 602, i.e., the p-chart, c-chart, and u-chart. These charts are used when the data being measured meet certain conditions (or attributes). For example, the p-chart is used with "binomial" data. P-charts are used for results of go-no go tests, such as percent of work orders completed within budgeted cost. In this case, a work order is either completed within budget or not ("go-no go"). P-charts have the advantage of taking into account the sample size (the number of work orders completed) and accounting for the high level of random fluctuations when the sample size is small (very few work orders completed).

The c-chart is used for "Poisson" processes. These are used with random arrival models, or when "counting" attributes. This type of chart, for example, can monitor the number of "defects" in each of many equal samples (constant sample size). Occurrence Reporting data (number of reports per month) empirically appear to fit the "Poisson" model, and the c-chart is recommended when charting occurrence report counts.

The u-chart is used when counting "defects" per sample when the sample size varies for each "inspection." The number of cases is counted for fixed time intervals, such as monthly or yearly, but the sample size (number of man-hours worked during each time interval) changes.

In one embodiment, the control limit calculator 406 selects the appropriate "chart" (and corresponding calculations) based on the type of measures 102 being analyzed. This may be determined automatically from the data or may be specified by the user. Of course, a wide variety of other charts 602 and associated SPC calculations may be used as known to those of skill in the art.

Thereafter, the control limit calculator 406 automatically calculates one or more control limits 412, such as an Upper Control Limit (UCL) and/or a Lower Control Limit (LCL) for the time series 600. In one embodiment, the control limit(s) 412 may be calculated according to the equations:

$$UCL = \bar{X} + Z\sigma \quad \text{Eq. 1}$$

$$LCL = \bar{X} - Z\sigma \quad \text{Eq. 2}$$

where $\bar{X}$ is the arithmetic average of the data, $\sigma$ is the standard deviation, and Z is an optional multiplier that may serve as a tolerance factor.

The arithmetic average ($\overline{X}$) of the data, also referred to as the mean, may be determined as follows:

$$\overline{X} = \frac{\sum_{i=1}^{n} X_i}{n} \quad \text{Eq. 3}$$

where $X_i$ is a measure 102 in the time series 600, and n is the number of measures 102 in the time series 600.

Calculations for the standard deviation may vary depending upon the type of control chart 602. For example, for an x-chart, there are at least two standard methods to calculate the standard deviation. The first is to apply the following equation:

$$\sigma = \sqrt{\frac{\sum (X_i - \overline{X})^2}{n-1}} \quad \text{Eq. 4}$$

The second method is to multiply the average range value for pairs of data points by 0.887.

For a c-chart, the standard deviation is the square root of the average:

$$\sigma = \overline{X} \quad \text{Eq. 5}$$

For a p-chart, the standard deviation is calculated for each datum value. The formula is:

$$\sigma = \sqrt{\frac{\overline{p}(1-\overline{p})}{N}} \quad \text{Eq. 6}$$

where $\overline{p} = \frac{\text{total\#successes}}{\text{total\#trials}}$ and $N = \#$ Trials in this time period.

For a u-chart, the standard deviation is likewise calculated for each datum value. The formula is:

$$\sigma = \sqrt{\frac{\overline{u}}{\frac{N}{\text{Std.sample.size}}}} \quad \text{Eq. 7}$$

where $u = \left(\frac{\text{total.defects}}{\text{total.sample.size}}\right)(std.\text{sample.size})$ and $N$ = sample size for current time period (i.e., lot sample size).

Other ways for calculating the standard deviation may be used for different types of control charts 602 as will be known to those of skill in the art.

In one embodiment, the value for Z effectively determines the tolerance of the control limits 412. For example, as shown in the normal distribution curve of FIG. 6, a Z value of 1 includes all of the data points within 1 standard deviation of the average, which would encompass approximately 68% of the data points. Similarly, a Z value of 2 includes all of the data points within 2 standard deviations, accounting for approximately 95% of the data points.

Thus, a smaller value of Z will result in tighter control limits 412, triggering alerts for data values closer to the average, while larger values of Z will result in looser control limits 412, resulting in a wider range of potential values without triggering an alert. In one embodiment, the value for Z may correspond to (or be derived from) the tolerance 410 specified by the user in FIG. 4. As an arbitrary example, a specified tolerance 410 or confidence value of 90% may correspond to a Z of 3. Other values may be used in different contexts within the scope of the invention.

In one embodiment, the control limit calculator 406 may refine the calculations for the control limits 412 based on new or existing data. For example, the control limit calculator 406 may look for trends in the existing data:

Individual points above the Upper Control Limit.

Individual points below the Lower Control Limit.

Seven points in a row all above average or all below average.

Seven points in a row increasing.

Seven points in a row decreasing.

Ten out of eleven points in a row all above average or all below average.

Cycles or other non-random patterns in the data.

Two out of three points in a row outside of two standard deviations above the average, or two out of three points in a row outside of two standard deviations below the average.

Four out of five points in a row outside of one standard deviation above the average, or four out of five points in a row outside of one standard deviation below the average.

If any of the above criteria are found to exist, the control limits 412 may need to be recalculated.

For example, if the initial control chart 602 shows individual point(s) outside of the control limits 412, the control limit calculator 406 may recalculate both the average and the standard deviation (which affect the control limits 412) without those point(s) included. After recalculating the average and control limits 412, the control limit calculator 406 may analyze the remaining data. If the new average appears to split the remaining data better than the original average (equal data points on either side of the average), then this confirms the credibility of removing the outliers.

After recalculating the average and control limits 412, further points may have become outliers. In severe cases, this can lead to an endless series of throwing out "outliers" until very little data are left. In such cases, it may be best to revert back to the original average and control limits 412.

In some cases, a number of points (e.g., seven or more) may be found in the time series 600 that are all increasing/decreasing. This condition indicates that a continuous change (ramp) may be occurring in the data. In one embodiment, the control limit calculator 406 may add the average and control limits. This Statistical Process Control (SPC) technique verifies that the data are undergoing continuous, significant change. SPC can be thought of as a formal "test" for the existence of significant change(s). In this case, the test shows that significant change is occurring.

If the average and control limits are added, the control limit calculator 406 may detect the continuous change as a series of step changes using the average and control limits over multiple, non-overlapping regions. Considerations are similar to methods used for seven points in a row above or below the average.

If the regions become too short, the control limit calculator 406 may simply leave one longer time interval region with points going from below the LCL to above the UCL (or vice-versa). Again, SPC can be thought of as "testing" for the existence of the trend.

Following removal of outliers or breaking the data into two or more regions, and recalculating a new standard deviation, there should be a decrease in the standard-deviation. This will cause the control limits 412 to be closer to the average. If there is: not a clear reduction in the standard deviation, splitting the data or throwing out the outlier may not be justified.

For a new datum outside of the control limits 412 (single datum point significant shift), the control limit calculator 412 may attempt to determine the cause and then determine actions corrective or reinforcing, depending on the direction of change to be taken.

If future data returns to within the control limits 412, the control limit calculator 406 may leave existing average and control limits 412 in place. If future data remains outside (or close to) the control limits 412, the control limit calculator 406 may calculate new average and control limits 412 as discussed above.

Those of skill in the art will recognize that the foregoing is only one SPC technique. A variety of other SPC techniques may be used within the scope of the invention. Further discussion of SPC techniques may be found in *Understanding Variation: The Key To Managing Chaos* (2d Edition), November 1999, by Donald J. Wheeler, which is incorporated herein by reference.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

Embodiments of the invention may include various steps, which may be embodied in machine-executable instructions to be executed by a general-purpose or special-purpose computer, or, alternatively, in another electronic device or system. In other embodiments, the steps may be performed by hardware components that contain specific logic for performing the steps, or by any combination of hardware, software, and/or firmware.

Embodiments of the present invention may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., server) to a requesting computer (e.g., client) by way of data signals embodied in a carrier wave or other propagation medium via a communication link (e.g., network connection).

What is claimed is:

1. A computer-implemented method comprising:
    allowing a user to specify at least one measure to be monitored in at least one dimension of a dimensional hierarchy;
    for each specified measure and for each specified dimension:
        extracting a time series from a multidimensional database for the specified measure in the specified dimension;
        automatically calculating one or more control limits for the specified measure in the specified dimension based on the extracted time series using a Statistical Process Control (SPC) technique;
    monitoring newly acquired data including each specified measure in each specified dimension for an out-of-limits condition based on one or more stored control limits;
    triggering an alert in response to an out-of-limits condition being detected; and
    storing each automatically-calculated control limit.

2. The method of claim 1, further comprising:
    allowing the user to specify a detection cycle, wherein monitoring further comprises periodically obtaining current data for each specified measure in each specified dimension according to the specified detection cycle.

3. The method of claim 1, further comprising:
    allowing the user to specify an alert delivery method, wherein triggering further comprises delivering an alert to the user via the specified alert delivery method.

4. The method of claim 3, wherein delivering an alert comprises delivering the alert via an e-mail service.

5. The method of claim 3, wherein delivering an alert comprises delivering the alert via a Short Message Service (SMS).

6. The method of claim 3, wherein delivering an alert comprises delivering the alert via a paging service.

7. The method of claim 1, further comprising:
    automatically recalculating at least one control limit after eliminating one or more outliers from existing data.

8. The method of claim 1, further comprising: automatically recalculating at least one control limit based on newly acquired data.

9. The method of claim 1, wherein automatically calculating one or more control limits comprises automatically calculating a control limit that is a function of an average and a standard deviation of the time series.

10. The method of claim 1, wherein automatically calculating one or more control limits comprises automatically calculating an upper control limit (UCL) according to the formula:

$$UCL = \overline{X} + Z\sigma$$

where $$\overline{X} = \frac{\sum_{i=1}^{n} X_i}{n}$$

$$\sigma = \sqrt{\frac{\sum (X_i - \overline{X})^2}{n-1}}$$

$X_i$ is a measure in the time series,
n is the number of measures in the time series, and
Z is tolerance factor.

11. The method of claim 1, wherein automatically calculating one or more control limits comprises automatically calculating a lower control limit (LCL) according to the formula:

$$LCL = \overline{X} - Z\sigma$$

where $$\overline{X} = \frac{\sum_{i=1}^{n} X_i}{n}$$

$$\sigma = \sqrt{\frac{\sum (X_i - \overline{X})^2}{n-1}}$$

$X_i$ is a measure in the time series,
n is the number of measures in the time series, and
Z is a tolerance factor.

12. A computer program product comprising a computer-readable storage medium, the computer-readable storage medium including:
program code for allowing a user to specify at least one measure to be monitored in at least one dimension of a dimensional hierarchy;
program code for extracting, for each specified measure and for each specified dimension, a time series from a multidimensional database for the specified measure in the specified dimension and automatically calculating, one or more control limits for the specified measure in the specified dimension based on the extracted time series using a Statistical Process Control (SPC) technique;
program code for monitoring newly acquired data including each specified measure in each specified dimension for an out-of-limits condition based on one or more automatically-calculated control limits;
program code for triggering an alert in response to an out-of-limits condition being detected; and
storing each automatically-calculated control limit.

13. The computer program product of claim 12, wherein the computer-readable medium further comprises:
program code for allowing the user to specify a detection cycle, wherein monitoring further comprises periodically obtaining current data for each specified measure in each specified dimension according to the specified detection cycle.

14. The computer program product of claim 12, wherein the computer-readable medium further comprises:
program code for allowing the user to specify an alert delivery method, wherein the program code for triggering an alert further comprises program code for delivering an alert to the user via the specified alert delivery method.

15. The computer program product of claim 14, wherein the program code for delivering an alert comprises program code for delivering the alert via an e-mail service.

16. The computer program product of claim 14, wherein the program code for delivering an alert comprises program code for delivering the alert via a Short Message Service (SMS).

17. The computer program product of claim 14, wherein the program code for delivering an alert comprises program code for delivering the alert via a paging service.

18. The computer program product of claim 12, wherein the computer-readable medium further comprises:
program code for automatically recalculating at least one control limit after eliminating one or more outliers from existing data.

19. The computer program product of claim 12, wherein the computer-readable medium further comprises:
program code for automatically recalculating at least one control limit based on newly acquired data.

20. The computer program product of claim 12, wherein the program code for automatically calculating one or more control limits comprises program code for automatically calculating a control limit that is a function of an average and a standard deviation of the time series.

21. The computer program product of claim 12, wherein the program code for automatically calculating one or more control limits comprises program code for automatically calculating an upper control limit (UCL) according to the formula:

$$LCL = \overline{X} - Z\sigma$$

where $$\overline{X} = \frac{\sum_{i=1}^{n} X_i}{n}$$

$$\sigma = \sqrt{\frac{\sum (X_i - \overline{X})^2}{n-1}}$$

$X_i$ is a measure in the time series,
n is the number of measures in the time series, and
Z is tolerance factor.

22. The computer program product of claim 12, wherein the program code for automatically calculating one or more control limits comprises program code for automatically calculating a lower control limit (LCL) according to the formula:

$$LCL = \overline{X} - Z\sigma$$

where $$\overline{X} = \frac{\sum_{i=1}^{n} X_i}{n}$$

$$\sigma = \sqrt{\frac{\sum (X_i - \overline{X})^2}{n-1}}$$

$X_i$ is a measure in the time series,
n is the number of measures in the time series, and
Z is a tolerance factor.

23. A system comprising:
a selection module to allow a user to specify at least one measure to be monitored in at least one dimension of a dimensional hierarchy;
a control limit calculator to extract, for each specified measure and for each specified dimension, a time series from a multidimensional database for the specified measure in the specified dimension and automatically calculate one or more control limits for the specified measure in the specified dimension based on the extracted time series using a Statistical Process Control (SPC) technique;
a monitoring module to monitor, for newly acquired data, each specified measure in each specified dimension for an out-of-limits condition based on one or more automatically-calculated control limits;
an alert module to trigger an alert in response to an out-of-limits condition being detected; and
storing each automatically-calculated control limit.

24. The system of claim 23, wherein the selection module is to allow the user to specify a detection cycle, and wherein the monitoring module is to periodically obtain current data for each specified measure in each specified dimension according to the specified detection cycle.

25. The system of claim 23, wherein the selection module is to allow the user to specify an alert delivery service, and wherein the alert module is to deliver an alert to the user via the specified delivery service.

26. The system of claim 25, wherein the specified delivery service comprises e-mail service.

27. The system of claim 25, wherein the specified delivery service comprises a Short Message Service (SMS).

28. The system of claim 25, wherein the specified delivery service comprises a paging service.

29. The system of claim 23, wherein the control limit calculator is to automatically recalculate at least one control limit after eliminating one or more outliers from existing data.

30. The system of claim 23, wherein the control limit calculator is to automatically recalculate at least one control limit based on newly acquired data.

31. The system of claim 23, wherein the control limit calculator is to automatically calculate a control limit that is a function of an average and a standard deviation of the time series.

32. The system of claim 23, wherein the control limit calculator is to automatically calculate an upper control limit (UCL) according to the formula:

$$UCL = \overline{X} + Z\sigma$$

where $$\overline{X} = \frac{\sum_{i=1}^{n} X_i}{n}$$

$$\sigma = \sqrt{\frac{\sum (X_i - \overline{X})^2}{n-1}}$$

$X_i$ is a measure in the time series, n is the number of measures in the time series, and Z is tolerance factor.

33. The system of claim 23, wherein the control limit calculator is to automatically calculate a lower control limit (LCL) according to the formula:

$$LCL = \overline{X} - Z\sigma$$

where $$\overline{X} = \frac{\sum_{i=1}^{n} X_i}{n}$$

$$\sigma = \sqrt{\frac{\sum (X_i - \overline{X})^2}{n-1}}$$

$X_i$ is a measure in the time series, n is the number of measures in the time series, and Z is a tolerance factor.

* * * * *